United States Patent [19]

Tanizaki et al.

[11] Patent Number: 4,487,452
[45] Date of Patent: Dec. 11, 1984

[54] ROTATABLE SEAT FOR AN AUTOMOTIVE VEHICLE

[75] Inventors: Hiroyuki Tanizaki, Yokohama; Takayoshi Ogawa, Oogaki; Yoshimi Ozaki, Toyoake, all of Japan

[73] Assignee: Nissan Motor Company, Limited, Yokohama, Japan

[21] Appl. No.: 325,752

[22] Filed: Nov. 30, 1981

[51] Int. Cl.³ .............................................. A47C 3/18
[52] U.S. Cl. .................................... 297/349; 297/92; 297/240; 248/415; 248/417; 248/425
[58] Field of Search ............... 297/349, 240, 241, 242, 297/92; 248/425, 417, 415, 418; 296/65 R

[56] References Cited

U.S. PATENT DOCUMENTS

| 1,808,659 | 6/1931 | Hultgren | 297/349 X |
| 1,937,578 | 12/1933 | Knight | 297/349 X |
| 2,809,690 | 10/1957 | Walthek et al. | 248/425 X |
| 3,223,376 | 12/1965 | Ciuffini et al. | 248/417 |
| 3,933,331 | 1/1976 | Blom | 297/349 X |

FOREIGN PATENT DOCUMENTS

| 2900514 | 7/1980 | Fed. Rep. of Germany | 297/349 |
| 2422366 | 12/1979 | France | 297/349 |
| 2446198 | 9/1980 | France | 297/349 |

Primary Examiner—William E. Lyddane
Assistant Examiner—Peter R. Brown
Attorney, Agent, or Firm—Schwartz, Jeffery, Schwaab, Mack, Blumenthal & Koch

[57] ABSTRACT

A rotatable seat for a multi-passenger automotive vehicle employs a latch mechanism releasable only by manual operation of an actuating lever. The latch mechanism includes latch-and-hook assemblies at both the front and rear of the seat to prevent inadvertent rotation of the seat. In addition, the seat rotation is governed by a cam having deep recesses at the two normal sitting positions. The cam is designed with sloping faces so that the weight of the seat drives rotation towards the normal positions. An additional safety mechanism prevents rotation of the seat unless the seat back is in a position preventing passengers from sitting thereon.

14 Claims, 17 Drawing Figures

ROTATABLE SEAT FOR AN AUTOMOTIVE VEHICLE

BACKGROUND OF THE INVENTION

The present invention relates to a rotatable seat for an automotive vehicle, such as van or micro-bus and so forth. More specifically, the invention relates to a rotating mechanism and locking or latch mechanism in the rotatable seat.

Recently, rotatable seats for use on the automotive vehicles, particularly on van or micro-bus type vehicles, have been developed. Generally, such rotatable seats are provided with a rotation or pivot mechanism and a latch mechanism. The rotation mechanism comprises a vertical axle rotatably received within a boss formed on the vehicle floor panel. The latch mechanism is usually provided adjacent the rotation mechanism and prevents the vertical axle from rotating. The latch mechanism has a latch member engageable with the vertical axle or other appropriate section of the rotation mechanism so that it may prevent the vertical axle and thus the rotatable seat from rotating.

Since the rotational force due to inertia caused by collision of the vehicle or abrupt deceleration is applied to the vehicle not only at the pivoted portion but also at locations spaced from the pivot, the conventional latch mechanism must provide enough force to prevent the seat from rotating. However, due to a lack of space below the seat, there could not be provided an appropriate mechanism having enough resistance against the rotational force applied to the portion apart from the pivot. Furthermore, according to the typical construction of the conventional rotatable seat, the latch member is urged into its latching position by a spring. This bias spring provided for the latch member has insufficient bias force for completely preventing the seat from accidentally rotating. On the other hand, between the bottom of the seat and the vehicle floor panel there is not enough clearance for a spring powerful enough to bias the latch member to the latching position. Assuming it is possible to provide a spring having enough force to prevent the seat from accidentally rotating, this may cause difficulty in releasing the seat from the latching position when the seat is to be rotated.

Preventing the seat from accidentally rotating may be accomplished by providing a latch mechanism at a position spaced from the pivot, where greater rotational force with respect to the pivot will be applied. This may require less biasing force than the latch mechanism provided adjacent the pivot. Therefore, releasing of the latch mechanism from the latching position may require less power to permit easy operation of seat rotation when the seat is to be rotated.

SUMMARY OF THE INVENTION

Therefore, it is an object of the present invention to provide a rotatable seat having a lock or latch mechanism which can effectively prevent the rotatable seat from accidentally rotating and requires less operational power for releasing the latch mechanism from the latching position when rotation of the seat is desired.

To accomplish the above-mentioned and other objects, there is provided a rotatable seat for an automotive vehicle which has a rotation mechanism and a latch mechanism independent of the rotational mechanism. The rotation mechanism includes means for vertically moving the seat between a first position in which the seat is prevented from rotating and a second position in which the seat is permitted to rotate about the vertical axis thereof. The latch mechanism includes means for providing latch-and-hook engagement at both the front and the rear of the seat. The latch-and-hook engagement is releasable from the engaged condition by operating a manual lever.

According to the present invention, the rotation mechanism further includes means for causing rotational movement of the seat to the second position due to the seat's own weight.

Further, according to another aspect of the invention, the rotatable seat is provided with a holding mechanism to hold the seat at the second position. The holding mechanism includes means for releasing the seat from the held position after seat rotation is completed.

According to a further aspect of the invention, the rotatable seat is provided with a safety mechanism which prevents inadvertent release of the latch-and-hook engagement while passengers are sitting thereon.

According to one embodiment of the invention, there is provided a rotatable seat for an automotive vehicle comprising a seat rotatably supported on a vehicle floor with a rotational pivot which permits the seat to rotate in the horizontal plane thereabout, a rotation mechanism for moving the seat between a first position in which the seat is prevented from rotating and a second position in which the seat is permitted to rotate about the rotational pivot, a latch mechanism for latching the seat in a position facing either forward or back with respect to the vehicle, the latch mechanism having first and second latching assemblies provided at the front and the rear of the seat, which first and second latching assemblies being movable between a third position in which the seat is prevented from rotating and a fourth position in which the seat is permitted to rotate about the rotational pivot and an actuating lever to operate said rotation mechanism to move the seat from the first position to second position and said first and the latching assemblies from the third position to the fourth position to permit seat rotation.

BRIEF DESCRIPTION OF THE DRAWINGS

The present invention will be understood more fully from the detailed description give herebelow and from the accompanying drawings of the preferred embodiments of the present invention, which, however, should be taken as limitative to the invention but for elucidation and explanation only.

In the drawings.

DESCRIPTION OF THE PREFERRED EMBODIMENT

Figure 1:
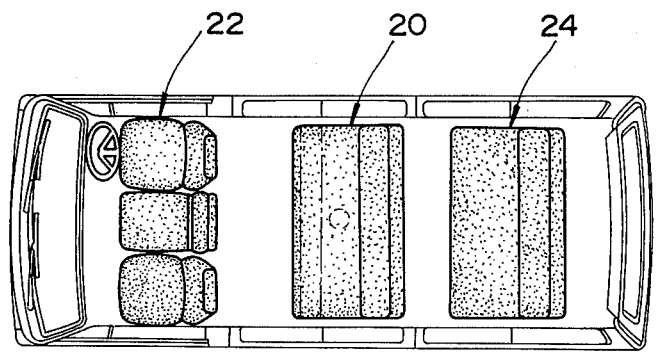
FIG. 1 is a plane view of a micro-bus type automotive vehicle having a rotatable seat according to the present invention.
Figure 2:
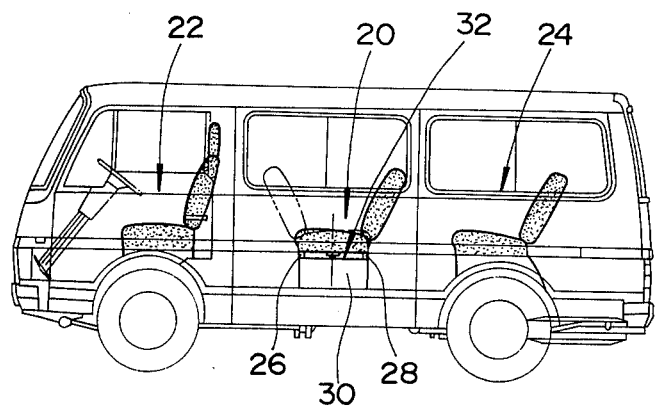
FIG. 2 is a side elevation of the micro-bus type automotive vehicle of FIG. 1.

Referring now to the drawings, particularly to FIGS. 1 and 2, there is illustrated a van or micro-bus type automotive vehicle. In the passenger compartment, three or more vehicle seats, generally of the bench type, are installed parallel with respect to one another. A rotatable seat 20 is positioned between a driver's seat 22 and a rear seat 24. The rotatable seat 20 is rotatable about its vertical axis to alternate the direction in which the seat faces between forward and backward, as shown in FIGS. 1 and 2. A pair of front and rear legs 26 and 28 are provided for the rotatable seat 20 and are mounted on a seat support 30. A rotation mechanism 32 is interpositioned between the bottom of the rotatable seat 20 and the upper surface of the seat support 30. The rotation mechanism 32 permits rotation of the rotatable seat about its vertical axis for alternating seat direction. A latch mechanism 34, which is shown in FIG. 3 and is also interpositioned between the bottom of the rotatable seat and the upper surface of the seat support, holds the seat 20 in either of two positions in which the rotatable seat is directed either forward or backward.

Figure 3:
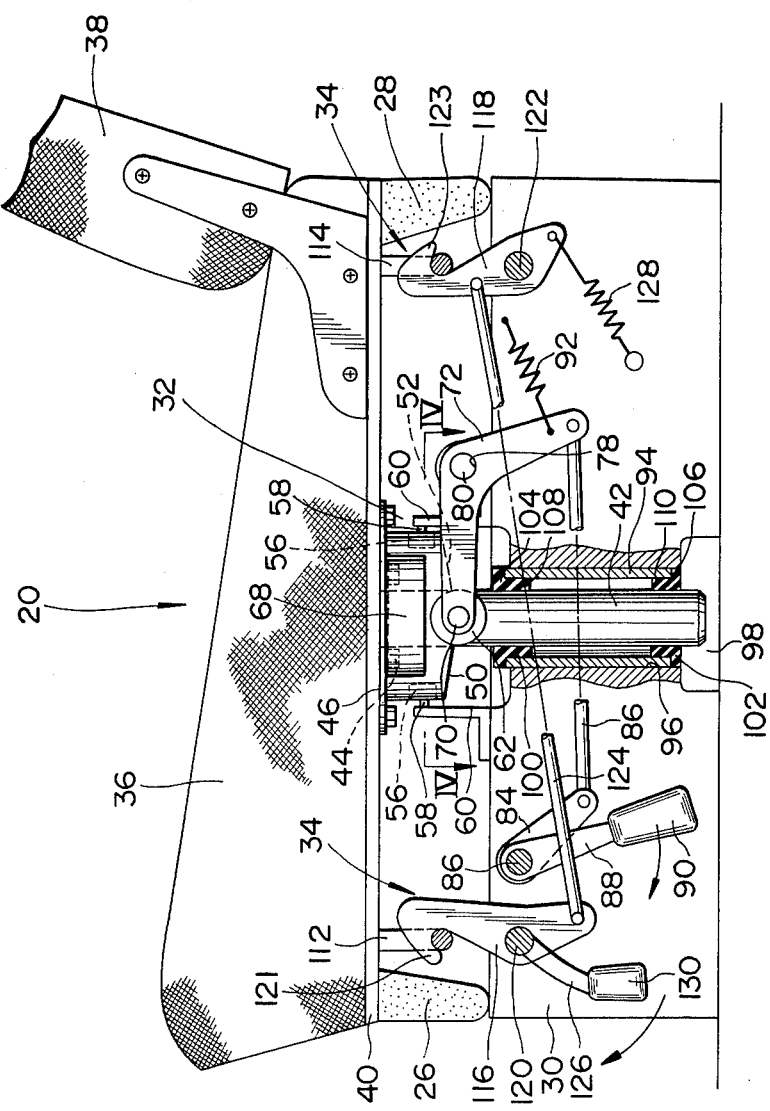
FIG. 3 is a sectional view of the first embodiment of a rotatable seat according to the present invention.
Figure 4:
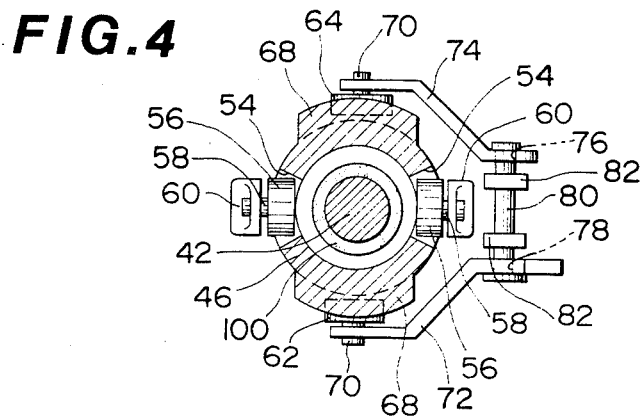
FIG. 4 is an enlarged sectional view of a rotational mechanism of the rotatable seat of FIG. 3, which is taken along line IV—IV of FIG. 3.

FIGS. 3 and 4 show the first embodiment of the rotatable seat structure according to the present invention and detailed construction of the rotation mechanism 32 and latch mechanism 34 of the rotatable seat. Generally, the rotatable seat comprises a seat cushion 36 and a seat back 38. A seat cushion 36 has a seat support frame 40 at the bottom thereof. A rotational axis 42 vertically extends from the seat support frame 40 at the center of the seat. The rotational axle 42 is fixed to the seat support frame 40 with fastening means such as fastening bolts 44. Surrounding the rotational axle 42, an annular cam member 46 is fitted to the center of the seat support frame 40. The cam member 46 has cam faces 50 and 52 on the lower edge thereof. The cam member 46 is also formed with a pair of diametrically-opposed rounded cut outs 54. Two support rollers 56 are each rotatably supported at one end of a corresponding shaft 58, the other end of which is secured to brackets 60 projected from the upper surface of the seat support 30. The cut outs 54 simultaneously receive the support rollers 56 when the rotatable seat 20 is latched at a position facing either forward or backward.

Figure 5:
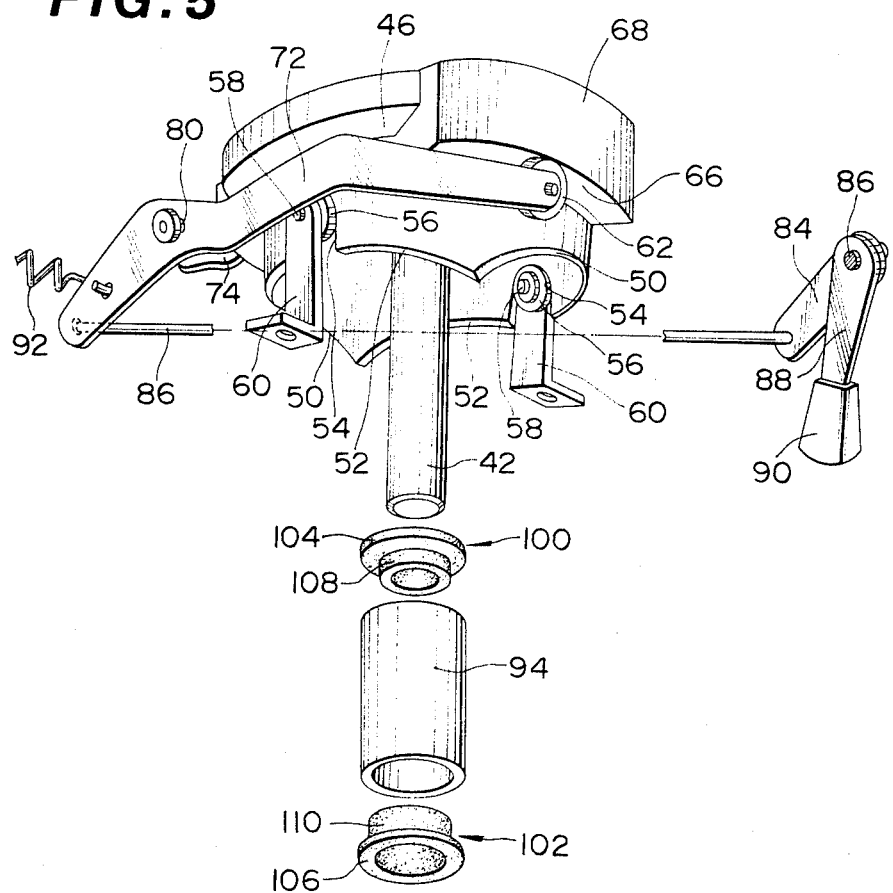
FIG. 5 is a perspective view of the rotation mechanism of the rotatable seat of FIG. 3.
Figure 6:
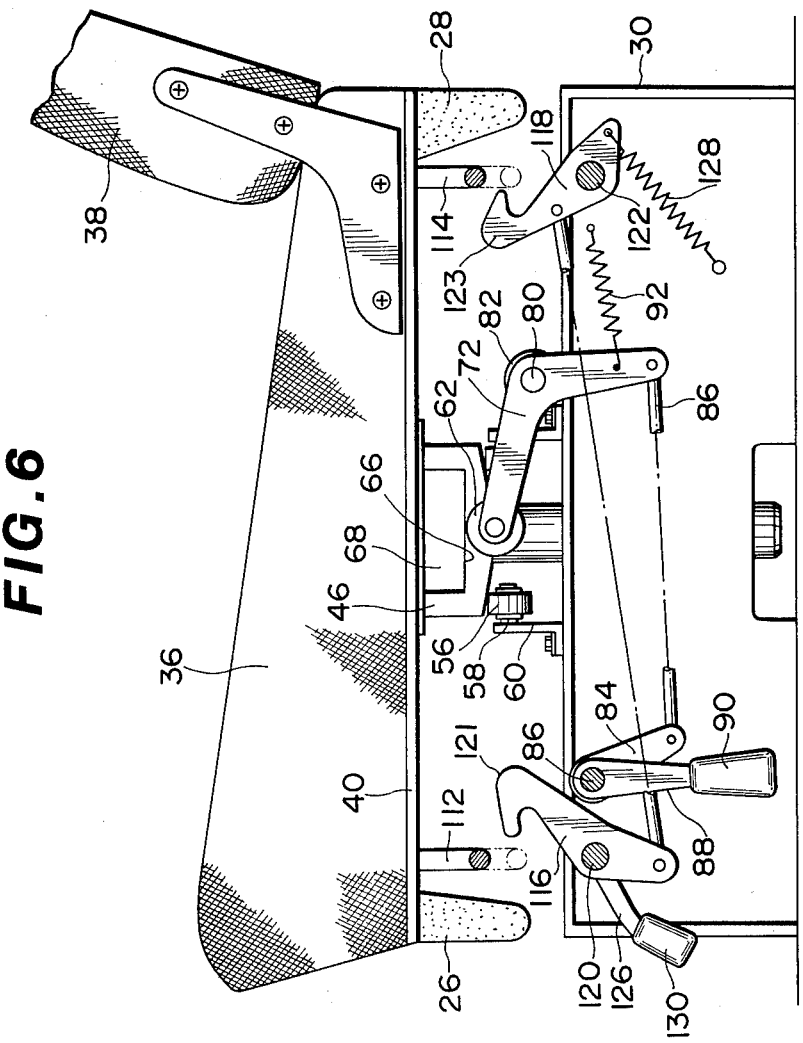
FIG. 6 is a similar view of FIG. 3 but showing the seat in a position lifted up for rotation.

As shown in FIG. 5, lifting rollers 62 and 64 abut the lower surfaces 66 of diametrically-opposed laterally-extending portions 68 of the cam member 46. The lifting rollers 62 and 64 are rotatable about shafts 70. The shafts 70 are secured to the ends of lifting levers 72 and 74. The lifting lever 74 is horizontally angled and has a circular hole 76 at the other end thereof and the lifting lever 72 is horizontally and vertically angled and has a circular hole 78 at an intermediate portion thereof. The holes 76 and 78 of the levers 74 and 72 receive either end of a rotational axle 80. The axle 80 is rotatably supported by brackets 82 projecting from the upper surface of the seat support 30. The axle 80 is secured to each of the holes 76 and 78 so that the levers 72 and 74 rotate with each other according to rotation of the axle 80.

The lower end of the lifting lever 72 is connected to a linking lever 84 via a connecting rod 86. The connecting rod 86 connects the lifting lever 72 to the linking lever 84 so that the lifting lever 72 and the lifting lever 74 can be rotated about the horizontal axle 80 thereof in response to rotation of the linking lever 84. The linking lever 84 is secured to a shaft 86 which is rotatably supported by the seat support 30. A manually-operable lift-up lever 88 is also secured to the shaft 86 for rotation with the linking lever 84. The lift-up lever 88 has at the free end thereof a handle 90 for comfortable gripping therefor. The lifting lever 72 is, in turn, biased by a spring 92 in the direction in which the lifting roller 62 is moved downwards about the horizontal axle 80. One end of the spring 92 is secured to the seat support 30.

The rotational axle 42 is received through a cylindrical boss 94 inserted into an bore 96 formed in the seat support 30. The seat support 30 has a recess 98 at a position housing the free end of the rotational axle 42. A pair of bushings 100 and 102 are inserted into opposite ends of the boss 94. Each of the bushings 100 and 102 has a flange portion 104 and 106 and a cylindrical portion 108 and 110 respectively which engage with the ends of the boss. The bushings 100 and 102 serve to prevent rotational friction between the rotational axle 42 and the inner periphery of the boss 94.

As shown in FIG. 3, the latch mechanism 34 generally comprises a pair of hooks 112 and 114 secured to the seat support frame 40 near the front and rear ends of the seat cushion 36, and a pair of latches 116 and 118 releasably engaged with the hooks. The upper end of each latch 116 and 118 has a hook portion 121 and 123 which is engageable with the hook 112 and 114 respectively. The latches 116 and 118 are respectively secured to shafts 120 and 122 rotatably supported by the seat support 30. A portion of the latch 116 above the shaft 120 is connected to a portion of the latch 118 below the shaft 122 via a connecting rod 124 for co-ordinated movement therewith. A manually-operable release lever 126 is secured to the shaft 120 in order to rotate the shaft 120 and the latch 116. The latch 118 is connected to one end of a bias spring 128. The other end of the bias spring 128 is engaged with the seat support 30 in order to provide a spring force biasing the latch 118 in the direction in which the hook portion 123 engages with the hook 114. Similar to the lift-up lever 88, the release lever 126 has a handle 130 for comfortable operation thereof.

Figure 7:
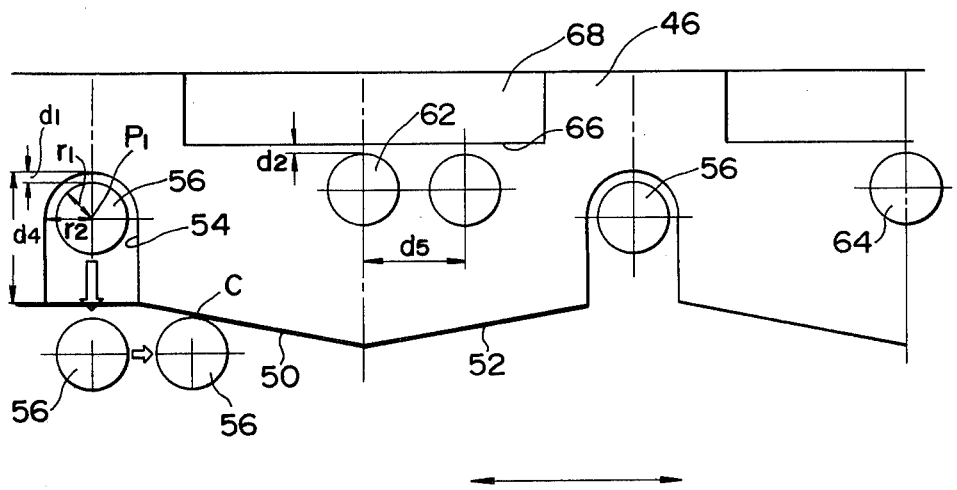
FIG. 7 is an illustration of the rotation mechanism which details the relative dimensions of a cam member, supporting roller and lifting roller.
Figure 8:
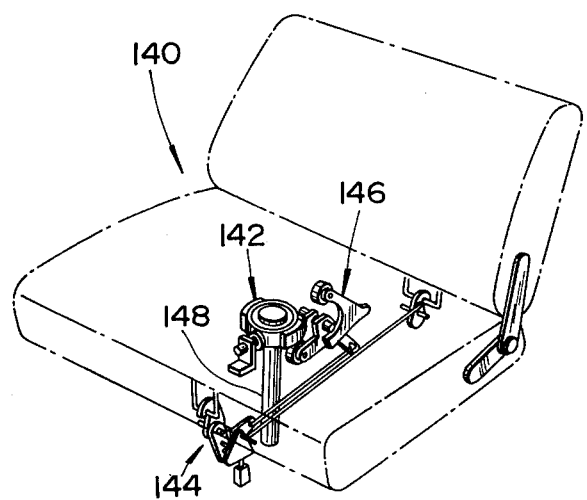
FIG. 8 is a perspective view of the second embodiment of the rotatable seat according to the present invention.

In operation, when the release lever 126 is pulled to rotate the shaft 122 clockwise as shown in FIG. 3, the latch 116 is thus rotated clockwise so that the hook portion 121 and the hook 112 disengage. At the same time, the latch 118 rotates counterclockwise according to the rotation of the latch 116 so that the hook portion 123 and the hook 114 disengage. In this position, when the lift-up lever 88 is pulled to rotate the shaft 86 together with linking lever 84 clockwise in FIG. 3, the rotation of the linking lever 84 is transmitted to the lifting lever 72 to rotate the latter with the other lifting lever 74. Due to the rotation of the lifting levers 72 and 74, the lifting rollers 62 and 64 come to contact with the lower surfaces 66 of the laterally-extending portions 68 of the cam member 46 to push the seat 20 upwards. The seat 20 is thus raised. Due to the upward movement of the seat 20, the support rollers 56 are released from the cut outs 54 of the cam member 46 as shown by the arrows in FIG. 7. Therefore, the seat 20 can horizontally rotate about the vertical axis of the rotational axle 42. At a position in which the seat is slightly rotated, the support rollers 56 come into contact with the cam faces 50, as shown in FIG. 7.

At this position, when the release lever 126 and the lift-up lever 88 are released by the user, they return to their respective initial positions. Although the release lever 126 and lift-up lever 88 return to their respective initial positions, the seat 20 with the cam member 46 is held in the unlatched and raised position by the supporting rollers 56. The seat 20 is thus permitted to rotate about the vertical axis of the rotational axle 42 in order to alternate the seat facing. In this position, the weight of the seat 20 is vertically applied to the contact points C between the support rollers 56 and the cam face 50. Since the cam face 50 is inclined with respect to the horizontal plane and the force due to gravity is applied perpendicular to the cam face, i.e., in the direction of moment, there exists a horizontal component of the reacting moment against gravity, and thus the seat 20 rotates about its vertical rotational axis by itself without requiring application of an external force. During rotation of the seat, the support rollers 56 remain in a position abutting the cam faces 50 and 52 so that the seat 20 and the cam member 46 are kept in the raised position.

As the seat 20 approaches the desired forward or backward position, the support rollers 56 reach the end of the appropriate cam face 50 or 52 and drop into the cut-outs 56, i.e., the seat 20 returns to the normal lowered position. At the same time, the hooks 112 and 114 are lowered over the ends 121 and 123 of the latchs 116 and 118. As the hooks pass over the hooked ends 121 and 123, the latches 116 and 118 are displaced slightly from and then returned to the initial positions thereof, now firmly engaged with the hooks 112 and 114. Due to the engagement of the support rollers 56 and the cut outs 54 and the engagement of the latches 116 and 118 and the hooks 112 and 114, the seat 20 is prevented from rotating.

The relationship between the support roller 56, lifting roller 62 and 64, and cam member 46 will be described in further detail with reference to FIG. 7. In the initial position, the support rollers 56 are placed within the cut outs 54 with a clearance $d_1$ from the bottom of the cut out. Also, the lifting rollers 62 and 64 are placed away from the lower surface 66 of the extending portion 68 at a distance $d_2$. These clearances are maintained in the lowered position by the length of the front and rear legs 26 and 28. The vertical motion distance of the lifting roller 62 and 64 is determined in correspondence with to the depth $d_4$ of the cut-outs 54 and in correspondence with the required vertical displacement of the cam member 46 with respect to the support rollers 56. The circumferential extent of the extending portion 68 is greater than the horizontal displacement distance $d_5$ of the lifting rollers 62 and 64, caused by operation of the lifting levers 72 and 74.

In the initial position, the horizontal axis $p_1$ of the support rollers 56 is placed at the center of the circle of the rounded bottom of the cut-outs 54. Each roller 62, 64 and 56 has diameter $r_1$ which is smaller than that $r_2$ of the rounded bottom of the cut out 54 so that it may provide clearance $d_1$ between the upper end of the roller 56 and the circumference of the cut-outs 54. This will aid smooth engagement of the support rollers 56 and the cut-outs 54 at the end of seat rotation.

FIGS. 8 to 13 show the second embodiment of the rotatable seat according to the present invention. In this embodiment, the rotation mechanism 32 and latch mechanism 34 in the foregoing embodiment are cooperatively combined so that they can be operated with a single actuating lever. Further, the present embodiment of the rotatable seat is provided with a holding mechanism for holding the seat at the raised position.

Figure 9:
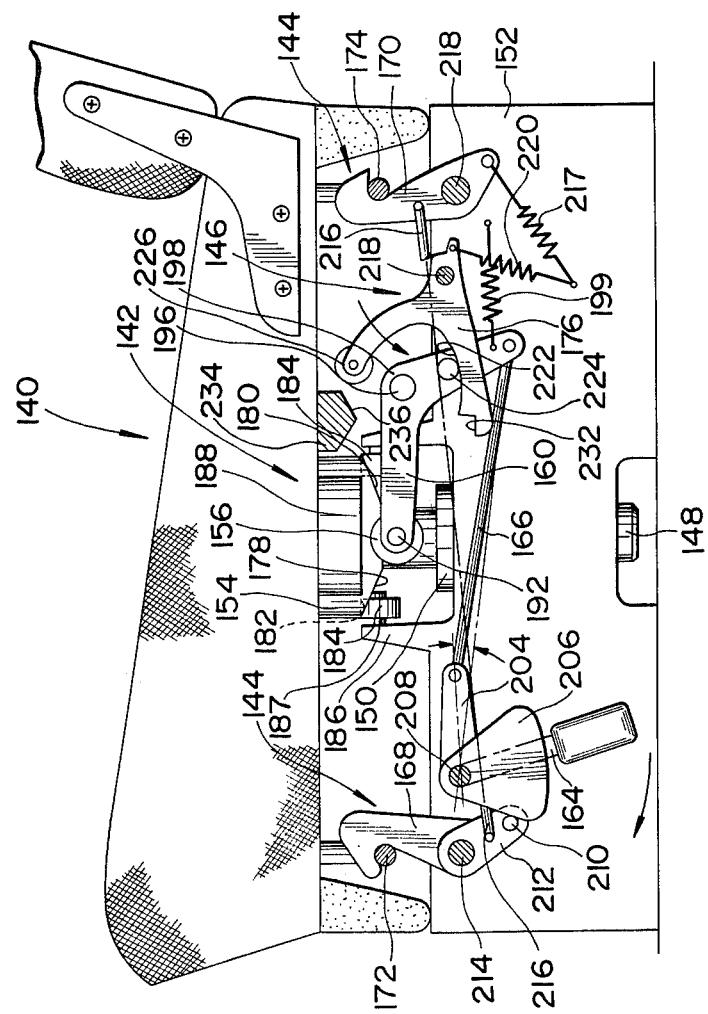
FIG. 9 is a sectional view of the rotatable seat of FIG. 8 showing detail of the construction thereof.

FIG. 9 is a fragmentary perspective view of the rotatable seat 140 in which the combined rotation mechanism 142 and latch mechanism 144 with the holding mechanism 146 is illustrated. As can be seen from FIG. 9, the rotational seat 140 has pivot means similar to that of the foregoing embodiment, about which the seat rotates. As shown in FIG. 9, the pivot means comprises a rotational axle 148 received with a cylindrical boss 150. The boss 150 is inserted into a through opening formed in a seat support 152. The rotational axle 148 is rotatable about the vertical axis of the boss for permitting rotation of the seat 140. Likewise to the first embodiment, a cam member 154 surrounds the rotational axle 148. A pair of lifting rollers 156 and 158 are movably provided adjacent the cam member 154. The lifting rollers 156 and 158 are rotatably mounted at one end of lifting levers 160 and 162 so that the lifting roller lift up the cam member 154 with the rotatable seat 140 by rotational movement of the lifting levers 160 and 162.

The lifting lever 160 is connected to an actuating lever 164 via a connecting rod 166. The actuating lever 164 is arranged so that it can also release latches 168 and 170 respectively engageable with hooks 172 and 174. The actuating lever 164 further operates a holding mechanism 146 which comprises a holding lever 176 pivotable between positions corresponding to latching and unlatching in response to the movement of the actuating lever.

Figure 10:
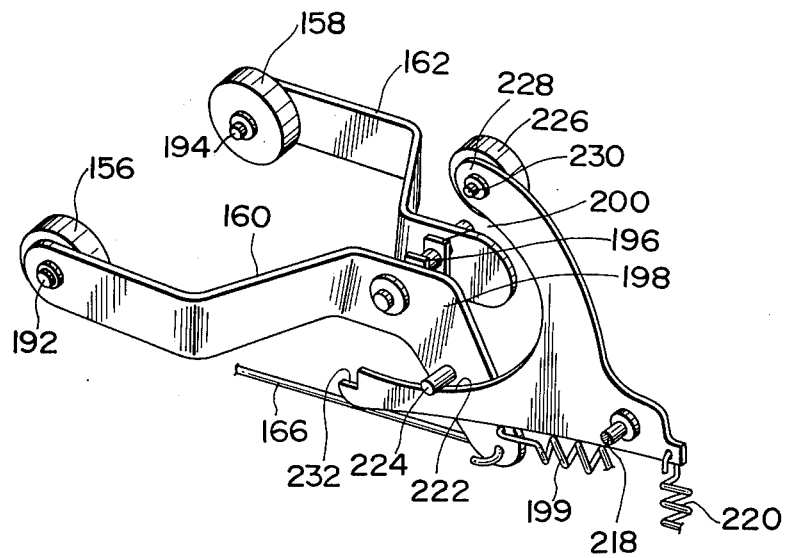
FIG. 10 is a perspective view showing the relationship between the lifting lever and the holding lever in the rotatable seat construction of FIG. 9.
Figure 11:
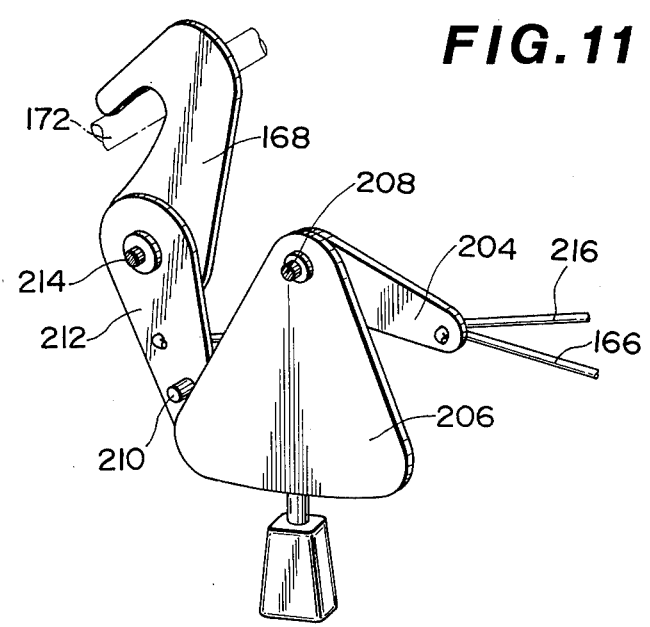
FIG. 11 is a perspective view showing an actuating lever of the rotatable seat of FIG. 9.

Now, referring to FIGS. 10 to 14, the rotation mechanism 142, the latch mechanism 144 and the holding mechanism 146 will be described in detail. Similarly to the foregoing first embodiment, the cam member 154 encircles the top of the rotational axle 148 and has cam faces 178 and 180 at the lower end thereof. Also, the cam member 148 has diametrically-opposed cut-outs 182 with rounded ends. Support rollers 184 rotatably supported by shafts 187 at the upper ends of brackets 186 are received in the cut-outs in the initial position of the seat 140. The lifting rollers 156 and 158 oppose the lower surface of extending portions 188 laterally extending from the outer periphery of the cam member 148 along the underside of the seat 140. The lifting roller 156 is rotatable about an axle 192 projecting from one end of the lifting lever 160. Likewise, the lifting roller 158 is rotatably mounted on an axle 194 projecting from one end of the lifting lever 162. As shown in FIG. 10, the lifting lever 160 is horizontally and vertically angled and secured onto one end of a shaft 196 at its vertical corner 198. On the other hand, the lifting lever 162 is horizontally angled and secured onto the other end of the shaft 196 at the end opposite the lifting roller 158. The shaft 196 is rotatably supported by a pair of brackets 200 projecting from the upper surface of the seat support 152. A bias spring 199 is connected to the lifting lever 160 to that it biases the latter to an initial position displaced from the cam member 148 as shown in FIG. 9.

Through a connecting rod 166 and a connecting lever 204, the lower end of the lifting lever 160 is connected to a fan-shaped cam lever 206 secured to a rotatable shaft 208 together with the actuating lever 164. As particularly shown in FIG. 11, front side edge of the fan-shaped cam lever 206 opposes a contact pin 210 projecting from a contact lever 212 which is secured to a rotatable shaft 214, to which, the latch 168 is also secured. The contact lever 212 is connected with the latch 170 via a connecting rod 216. The latch 170 is biased toward an initial position, in which the latch 170 engages with the hook 172 or 174 by a bias spring 217.

The holding lever 176 is pivotably supported by a shaft 218. The holding lever 176 is biased upwards by a spring 220 so that the portion 222 thereof constantly contacts with the underside of a pin 224 projecting from the side surface of the lifting lever 160. Thus, the pin 224 limits rotation of the holding lever 176 about the shaft 218. A roller 226 is rotatably mounted on a shaft 230 at the top of a portion 228 of the holding lever 176. The holding lever 176 has a cut-out 232 at the end of the portion 222. The cut-out 232 is engageable with the pin 224 at the extreme position of rotation of the holding lever 176. The roller 226 opposes a cam plate 234 with a cam face 236 so that it contacts the latter during rotation of the seat 140.

In the initial position where the rotatable seat 140 is directed forward or backward and locked to be prevented from rotating, the latches 168 and 170 engage the hooks 172 and 174 to maintain the seat 140 in the latched position. At this position, the support rollers 184 are disposed within the cut-outs 182 to prevent the seat from rotating in cooperation with the latch-and-hook engagement. The pin 224 of the lifting lever 160 pushes the holding lever downwardly against the spring force of the spring 220 in order to displace the roller 226 from the cam face 236 of the cam plate 234. Also, the lifting rollers 156 and 158 are disposed in an initial position displaced from the lower surface of the extending portions 188 and 190 at a distance $d_1$. In this position, front and rear legs 238 and 240 extending from the bottom of the rotatable seat 140 rest on the upper surface of the seat support 152.

In operation, when the actuating lever 164 is rotated about its rotation axis in the clockwise direction, the cam lever 206 coaxially secured to the shaft 208 is thus rotated clockwise to force the pin 210 of the contact lever 212 clockwise. By rotation of the contact lever 212 about the axis thereof, the latch 168 is rotated clockwise to disengage from the hook 172. Corresponding to the rotation of the contact lever 212, the latch 170 rotates counterclockwise to disengage from the hook 174.

Figure 12:
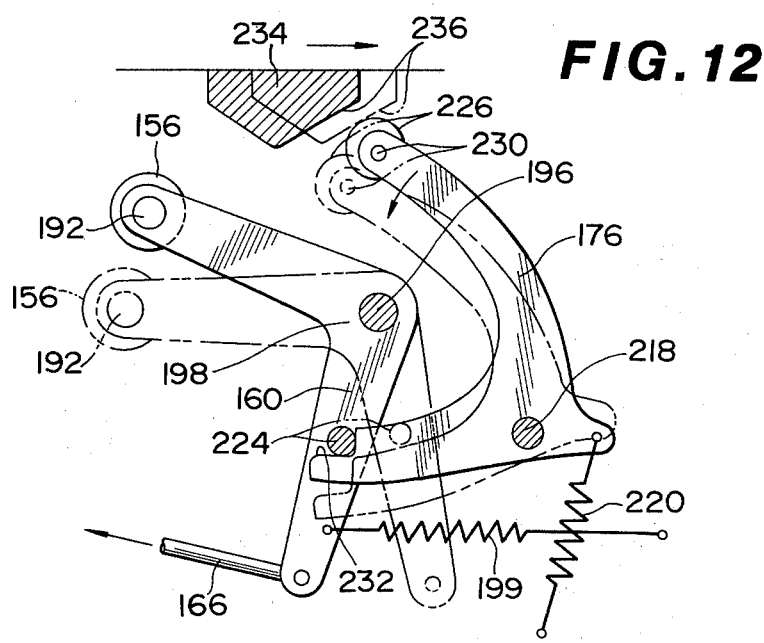
FIG. 12 is a side elevation view of the holding lever showing movement thereof.
Figure 13:
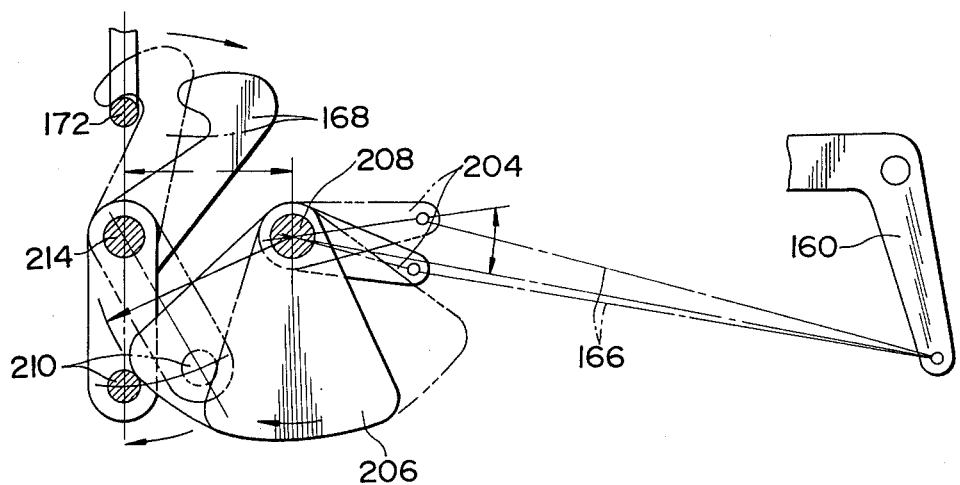
FIG. 13 is a side elevation view of the actuating lever showing operation thereof.

According to the rotation of the actuating lever 164, the cam lever 206 rotates clockwise in FIGS. 9 and 12. The rotational force of the cam lever 206 is transmitted to the lifting lever 160 via the connecting lever 204 and the connecting rod 166. The lifting lever 160 is thus rotated with the lifting lever 162 to bring the lifting rollers 156 and 158 into contact with the lower surfaces of the extending portions 188 and 190 to raise the seat 140. During lifting lever rotation, holding lever 176 rotates about the axis of the shaft 187 to engage the cut-out 232 with the pin 224. The profile of the cut-out 232 does not easily permit release of the pin 224. Thus, the holding lever 176 maintains the lifting lever 160, and therefore the seat 140, in the raised position. In this position, due to the weight of the seat, the support rollers 184 moves along the cam faces 180 and 182 of the cam member to rotate the seat 140 as described with respect to the first embodiment. During seat rotation, the cam face 236 of the cam plate 234 contacts the roller 226 to push the latter downward. The holding lever 176 rotates counterclockwise in response to the downward force to release the pin 224 from the cut-out 232. Thus, the holding lever 176 returns to its initial position, as shown in phantom line in FIG. 12. By releasing the pin 224 from the cut out 232, the lifting lever 160 together with the lifting lever 162 is allowed to return the initial position thereof. Simultaneously, the latch 168 and 170 engage with the hooks 172 and 174 again in order to prevent the seat from rotating.

Figure 14:
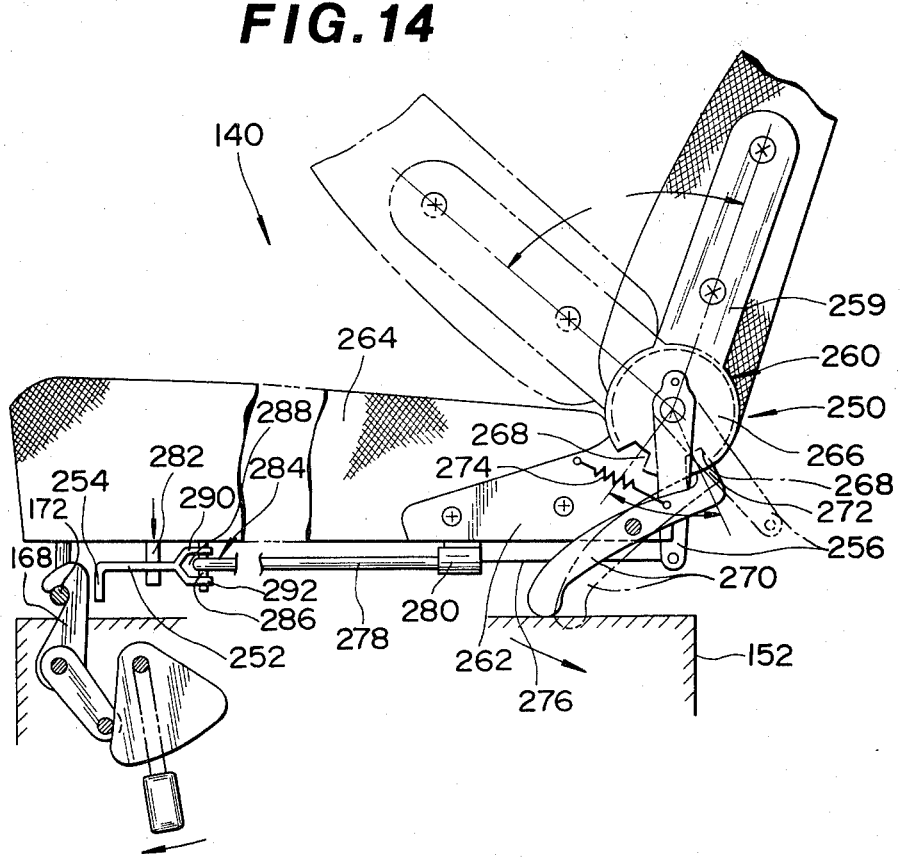
FIG. 14 is a side elevation view of the rotatable seat according to a modification of the second embodiment of FIG. 9.

Referring to FIG. 14, there is illustrated a modification of the second embodiment. In this modification, an interlock mechanism is provided in order to prevent passengers from subjecting themselves to danger due to sitting in the rotatable seat when it is unlatched. The interlock mechanism therefore inhibits sitting while the rotatable seat is in the raised position.

The interlock mechanism 250 comprises a blocking lever 252 located immediately clockwise of the latch 168 so that one end 254 thereof abuts the back of the latch in the normal position. The blocking lever 252 is connected to a lever 256 secured on the side of the pivotable seat back 258. The lever 256 is integral with a pivotable piece 259 of a hinge mechanism 260. The hinge mechanism 260 includes a stationary piece 262 secured to the seat cushion 264 and an outer casing 266 covering the end of the axle of the hinge mechanism 260. The outer casing 266 has a cut-out 268 on its circumference.

A locking lever 270 with an angled end 272 is pivotably supported on the side of the seat cushion 264 near the outer casing 266. A bias spring 274 has one end secured to the stationary piece 262 of the hinge mechanism and the other end attached to the locking lever 270 so as to urge the locking lever 270 toward the outer casing 266. The end 272 of the locking lever 270 in contact with the outer casing 266 is angled toward the outer casing 266 so that it may engage with the cut-out 268 when the seat back 258 is pivoted sufficient far toward the seat cushion 264.

Figure 16:
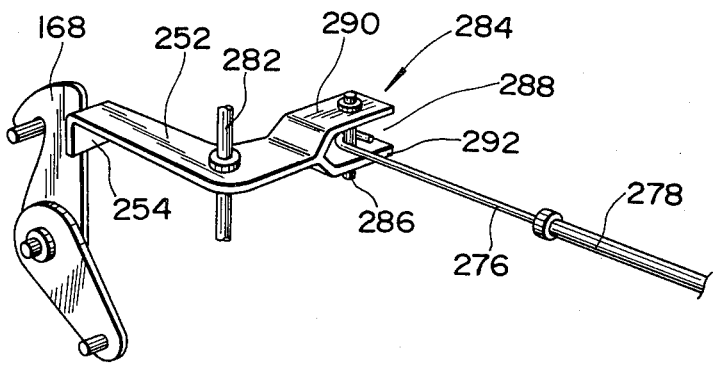
FIG. 16 is a perspective view of a blocking lever in the interlock mechanism provided in the rotatable seat of FIG. 14.

A coaxial inner and outer cables 276 and 278 are interposed between the blocking lever 252 and the lever 256. The outer cable 278 is secured to the bottom of the seat cushion 264 by a bracket 280. The inner cable 276 is movable through the outer cable according to the movement of the lever 256. The blocking lever 252 is pivotably supported by a pivot 282 so that it can rotate horizontally thereabout. As shown in FIG. 16, the blocking lever 252 has a forked end 284. A connector pin 286 spans the space 288 between the arms 290 and 292 of the forked end 284. The connector pin 286 pivotably engages the end of the inner cable 276. The inner cable 276 is movable through the outer cable 278 according to movement of the lever 256.

Figure 17:
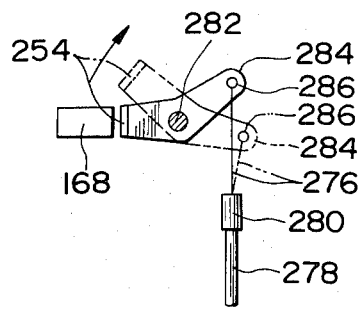
FIG. 17 is a plan view of the blocking lever showing operation thereof.
Figure 15:
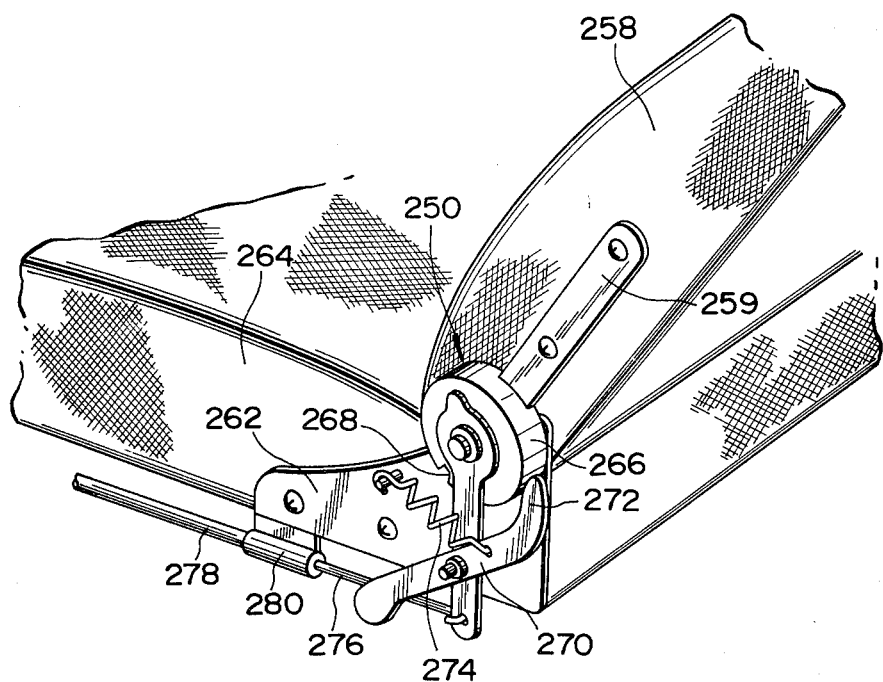
FIG. 15 is a perspective view of the rotatable seat of FIG. 14.

In the normal position, the end 254 of the blocking lever 252 prevents release of the latch 168. Therefore, the actuating lever 164 cannot rotate about its rotational axis. To enable the actuating lever 164 to be operated, the seat back 258 must be held as illustrated by phantom lines in FIG. 14. According to the rotation of the seat back 258 and thus the rotatable piece 259, the lever 256 pivots counterclockwise in FIG. 14. The inner cable 276 thus slides through the outer cable 278 so that the blocking lever 252 is pulled to rotate about the pivot 282 to a position displaced from the latch 168 as illustrated by phantom lines in FIG. 17. Thus, the latch 168 is permitted to rotate to allow the actuating lever 164 to be operated.

During the rotation of the seat back 258 about the hinge axle, the cut out 268 of the outer casing 266 is moved into opposition with the angled end 272 of the locking lever 270 so as to engage the angled end 272. Due to the engagement of the locking lever and the outer casing, the seat back 258 is prevented from rotating back to the normal position. The locking lever 270 is maintained in this position by the force of the bias spring 274. The rotatable seat 140 can rotate normally about its rotational axis as described previously. When the seat reaches the desired position, the seat 140 is lowered to the initial position thereof. In this position, the free end of the locking lever 270 abuts against the upper surface of the seat support 152. The locking lever 270 is thus rotated clockwise against the biasing force of the spring 274 to disengage the angled end of locking lever 270 and the cut out 268 of the outer casing 266. This permits the seat back 258 to return to the normal position.

As understood hereabove, the present invention fulfills all of the objects and advantages sought therefor.

What is claimed is:

1. A rotatable seat for an automotive vehicle comprising:
   a seat rotatably supported on a vehicle floor with a rotational pivot which permits the seat to rotate in a horizontal plane thereabout;
   a rotation mechanism for moving said seat between a first position in which the seat faces either forward or backward with respect to the vehicle and in which the seat is prevented from rotating by said rotation mechanism, and a second position in which the seat is permitted to rotate by said rotation mechanism about the rotation pivot;
   a latch mechanism for latching the seat in a position facing either forward or backward with respect to the vehicle, said latch mechanism having first and second latching assemblies provided, respectively, at the front and rear of the seat, said first and second latching assemblies being movable between a third position in which said latching assemblies hold the seat in said first position and prevent the seat from rotating and a fourth position in which the seat is permitted to rotate about the rotational pivot; and
   an actuator mechanism connected to said rotation mechanism to operate said rotation mechanism to move the seat from said first position to said second position and connected to said latch mechanism to move said first and second latching assemblies from said third position to said fourth position to permit seat rotation.

2. A rotatable seat for an automotive vehicle comprising:
   a seat rotatably supported on a vehicle floor with a rotational pivot which permits the seat to rotate in a horizontal plane thereabout;
   a rotation mechanism for moving said seat between a first position in which the seat is prevented from rotating and a second position in which the seat is permitted to rotate about the rotational pivot, said rotation mechanism including rotating means for causing seat rotation when the seat is in said second position, which rotating means provides rotational force derived from the weight of the seat;
   a latch mechanism for latching the seat in a position facing either forward or backward with respect to the vehicle, said latch mechanism having first and second latching assemblies provided at the front and rear of the seat, which first and second latching assemblies are movable between a third position in which the seat is prevented from rotating and a fourth position in which the seat is permitted to rotate about the rotational pivot; and
   an actuator lever to operate said rotation mechanism to move the seat from said first position to said second position and said first and second latching assemblies from said third position to said fourth position to permit seat rotation.

3. The seat as set forth in claim 1 or 2, wherein said latch mechanism is operated independently of said rotation mechanism.

4. The seat as set forth in claim 1 or 2, wherein said latch mechanism connected to said rotation mechanism so that both can be operated by said actuating lever.

5. A seat as set forth in claim 1 or 2, which further comprises means for maintaining said seat in said second position while said seat is rotating.

6. A seat as set forth in claim 1, which further comprises interlock means which blocks movement of said latching mechanism from said third position to said fourth position unless the seat back of said seat is in a position preventing sitting on the seat.

7. A seat as set forth in claim 1 or 2, wherein said rotation mechanism comprises a circular cam member fixed onto a seat cushion, which cam member is provided with a cam face and cut-outs, a plurality of support rollers initially received within said cut-outs while said seat is placed in said first position and contacting said cam face to cause rotation of the seat by movement along said cam face in said second position, and lifting levers with lifting rollers operable by said actuating lever to raise said cam member and said seat so that said seat is moved from said first position to said second position.

8. A seat as set forth in claim 7, wherein said lifting levers are connected to said latch mechanism so that said latch mechanism can be operated by said actuating lever together with said lifting levers.

9. A seat as set forth in claim 8, further comprising a holding lever for maintaining said seat in said second position by blocking return motion of said lifting lever to the initial position thereof, said holding lever being engageable with a pin projecting from said lifting lever in said second position, the engagement between said pin and holding lever being released as said seat moves from said first to said second position.

10. A seat as set forth in claim 9, further comprising a blocking mechanism for preventing movement of said latch assemblies from said third position to said fourth position, said blocking mechanism comprising a blocking lever placed adjacent said latch assemblies, said blocking lever being connected to a hinge lever, provided for a hinge between the seat back and seat cushion, for securely holding the seat back near the seat cushion so that said blocking lever is moved to a position permitting said latch assemblies to move to said fourth position when the seat back is held near the seat cushion.

11. A seat as set forth in claim 10, wherein said blocking mechanism incorporates means for latching the seat back near the seat cushion while said seat rotates, said latching means releasing the seat back when the seat moves from said second position to said first.

12. A rotatable seat for an automotive vehicle comprising:
- a seat assembly rotatable about a pivot with respect to a vehicle floor;
- a self-propelling rotation mechanism operative for movement between a latching position and a rotating position, said rotation mechanism including means for producing a self derived rotational force for causing rotational movement of said seat assembly about said pivot when said rotation mechanism is in its rotating position;
- a latch mechanism for latching said seat assembly at a first position in which the seat assembly is directed forwardly and a second position in which the seat assembly is directed rearwardly, said latch mechanism being operative for movement between a latching position for latching said seat assembly at one of said first and second positions and an unlatching position permitting pivotal movement of the seat assembly; and
- actuator means associated with said rotation mechanism and said latch mechanism for moving the rotation mechanism to said rotating position from said latching position and moving the latch mechanism to said unlatching position from said latching position.

13. A rotatable seat for an automotive vehicle comprising:
- a seat assembly rotatable about a pivot with respect to a vehicle floor;
- a rotation mechanism associated with said seat assembly, and including means for causing rotational movement of said seat assembly, said rotational movement causing means being operative for movement between a latching position in which said seat assembly is latched either in a first forwardly directed position or a second rearwardly directed position, and a rotating position in which said seat assembly is rotatable about said pivot for reversing the seat direction; and
- a latch mechanism associated with said seat assembly and adapted to latch said seat assembly at said first and second positions, said latch mechanism being spaced from said rotation mechanism and operative for movement between a latching position in which it latches the seat assembly at said first or second positions and an unlatching position in which it permits rotational movement of said seat assembly.

14. A rotatable seat for an automotive vehicle comprising:
- a seat assembly including a seat cushion and a seat back pivotable with respect to said seat cushion between a folded position and an unfolded position, said seat assembly being rotatable about a vertical pivot relative to a vehicle floor for changing seat direction between a frontwardly directed first position and a rearwardly directed second position;
- a rotation mechanism associated with said seat assembly and operative for movement between a latching position in which the seat assembly is latched at one of said first and second positions and a rotating position in which said seat assembly can rotate about said pivot;
- a latch mechanism associated with said seat assembly and being independent of said rotation mechanism, said latching mechanism being operative for movement between a latching position in which the seat assembly is latched at one of said first and second positions and an unlatching position allowing the seat assembly to rotate about said pivot, and means associated with said seat assembly and said latch mechanism for preventing said latch mechanism from moving to said unlatching position when said seat assembly is in said unfolded position; and
- an actuator means associated with said rotation mechanism and latch mechanism for moving the rotation mechanism to said rotating position and the latch mechanism to said unlatching position.

* * * * *